United States Patent [19]

Horn et al.

[11] Patent Number: 5,039,502

[45] Date of Patent: Aug. 13, 1991

[54] PROCESS FOR THE PREPARATION OF METAL NITRATES

[75] Inventors: Gerhardt Horn, Oberhausen; Jürgen Lohr, Dortmund; Klaus Moraw, Dinslaken; Winfried Materne, Wetter, all of Fed. Rep. of Germany

[73] Assignee: Hoechst Aktiengesellschaft, Oberhausen, Fed. Rep. of Germany

[21] Appl. No.: 644,878

[22] Filed: Jan. 23, 1991

Related U.S. Application Data

[63] Continuation of Ser. No. 475,132, Feb. 5, 1990, abandoned.

[30] Foreign Application Priority Data

Feb. 2, 1989 [DE] Fed. Rep. of Germany ....... 3904836

[51] Int. Cl.$^5$ .............................................. C01B 21/48
[52] U.S. Cl. .................................................. 423/395
[58] Field of Search .......................................... 423/395

[56] References Cited

U.S. PATENT DOCUMENTS

| | | |
|---|---|---|
| 2,053,518 | 9/1936 | Crittenden ........................ 423/395 |
| 2,581,518 | 1/1952 | Critchley ........................... 423/395 |
| 2,581,519 | 1/1952 | Critchley ........................... 423/395 |
| 4,305,846 | 12/1981 | Jennings ........................... 423/395 |
| 4,808,393 | 2/1989 | Lewchalermwong ............. 423/395 |

FOREIGN PATENT DOCUMENTS

| | | |
|---|---|---|
| 65608 | 12/1982 | European Pat. Off. . |
| 27798 | 3/1975 | Japan ................................ 423/395 |
| 270220 | 11/1986 | Japan ................................ 423/395 |
| 30502 | 6/1910 | United Kingdom ............... 423/395 |

OTHER PUBLICATIONS

Industrial Inorganics, vol. 76, p. 171 (1972); 115585f, "Nickel Nitrate Production".
Industrial Inorganics, vol. 81, p. 169 (1974); 172286m, "Nickel Nitrate Production".
Catalysis, Kinetics, vol. 105, p. 439; (1986) 30805v, "Nickel Nitrate Solution for Catalysts".

*Primary Examiner*—Wayne A. Langel
*Attorney, Agent, or Firm*—Jordan B. Bierman

[57] ABSTRACT

A process for the preparation of aqueous metal nitrate solutions by dissolving the metal in nitric acid. The formation of ammonium nitrate is suppressed and the dissolution process is accelerated by adding nitrous acid or a substance which forms nitrous acid.

24 Claims, No Drawings

PROCESS FOR THE PREPARATION OF METAL NITRATES

This application is a continuation of application Ser. No. 07/475132, filed 02/05/90, now abandoned.

The present invention relates to a process for the preparation of aqueous metal nitrate solutions, in particular nitrates of the elements having the atomic numbers 24 to 28, by dissolving the metal in nitric acid. On reaction of the metal with nitric acid, considerable amounts of the contaminant ammonium nitrate are formed as a consequence of uncontrollable side reactions. Separation of the ammonium nitrate from the metal nitrate is only possible by means of a complex and expensive purification operation, for example by crystallization. These metal nitrates are useful as components of catalysts, especially hydrogenation catalysts.

BACKGROUND OF THE INVENTION

The formation of ammonium nitrate can be avoided by starting from a metal oxide or metal carbonate which is dissolved in nitric acid. Although metal nitrate solutions which are free from ammonium nitrate are obtained in this way, this must be weighed against the fact that the starting materials are generally substantially more expensive and of lower purity than a metal obtained, for example, by electrolytic deposition or by decomposition of a metal carbonyl.

The metal to be dissolved is mixed with nitric acid. A stoichiometric excess of nitric acid on the one hand favors dissolution of the metal and on the other hand counteracts any possible hydrolysis of the metal nitrate already formed in the aqueous solution. For reasons of simple handling, the nitric acid should have a concentration of from 20 to 65% by weight. The metal can be treated with a correspondingly concentrated aqueous nitric acid, or a more concentrated nitric acid can be fed to the metal mixed with water. The nitric acid can be added continuously or in portions. While it is possible to add all the nitric acid necessary in one portion, it may in some cases be advantageous to spread the addition of the nitric acid over several portions to allow the reaction to proceed in a controlled manner.

The nitric acid is usually employed in excess relative to the metal to be dissolved. Since the dissolution of metal in piece form is very slow at room temperature, it is advisable to work at elevated temperatures. Nevertheless, the dissolution, in particular of manganese, chromium, nickel, and cobalt, requires a considerable time even at temperatures of 80° C. and above. Although the dissolution can be simplified by using particularly finely divided metal, the metal to be processed on an industrial scale is usually not in powder form, but instead in piece form, so that this time-saving procedure cannot be used.

When finely divided metal is used, there is also the disadvantage of the formation, caused (for example) by stirring, of undesired metal dust. For this reason, the use of larger metal particles, such as microspheres, granules, electrode cuttings, brickettes, or crowns is preferred.

As a consequence of the increasing reactivity of nitric acid at higher temperatures, it should be insured that the reaction vessel is resistant to nitric acid. The material of the reaction vessel frequently sets limits to the use of elevated temperatures.

According to a process for preparation of nickel nitrate, to prevent the formation of ammonium nitrate, described in the Russian Journal of Inorganic Chemistry 1959, 11, 1122, it is recommended to add 30% hydrogen peroxide during the dissolution of metallic nickel in nitric acid. Based on ammonium nitrate, at least stoichiometric amounts of hydrogen peroxide are required. Since large amounts of hydrogen peroxide are additionally consumed under the reaction conditions due to decomposition, this process is also unacceptable economically in view of the difficulties in the handling of 30% strength hydrogen peroxide.

According to a procedure published in Dorofeeva et al., Khim. Prom-st. (Moscow) 1974, (8), 603–6, [Chem. Abstracts 81, 172286m (1974)], the formation of ammonium nitrate during the preparation of nickel nitrate is suppressed by adding metallic copper to the nickel to be dissolved or by using copper-containing nickel for the dissolution in nitric acid. It is disadvantage that the nickel nitrate solution obtained is contaminated with copper nitrate, as this material must be removed using separate purification steps.

BRIEF DESCRIPTION OF THE PRESENT INVENTION

On the basis of the above, there is a demand for a process which avoids the above-mentioned disadvantages, effectively prevents formation of ammonium nitrate and, at the same time, significantly reduces the time necessary for dissolution of the metal in the nitric acid.

This object is achieved by the preparation of nitrates of a metal of atomic numbers 24 to 28 in aqueous solution by dissolving the metal in nitric acid at elevated temperature and, if appropriate, at elevated pressure. The process comprises adding 0.2 to 2 mol of nitrous acid or a corresponding amount of a substance which forms nitrous acid per g-atom of metal to be dissolved. For simplicity, the foregoing substances will be referred to as the additive.

As can be shown in a large number of experiments, the formation of ammonium nitrate is only slightly dependent on the reaction conditions chosen. Thus, changes in the reaction temperature, as well as variations in the nitric acid concentration and the rate of addition of the nitric acid, do not significantly affect the formation of ammonium nitrate, in particular on dissolution of cobalt and nickel. Even the addition of oxygen does not significantly reduce the formation of ammonium nitrate.

Surprisingly, the formation of ammonium nitrate is considerably reduced by adding nitrous acid (or a substance which forms nitrous acid to a corresponding extent under the reaction conditions) during dissolution of the metal, in particular of cobalt and nickel.

DETAILED DESCRIPTION OF THE PRESENT INVENTION

Using the procedure according to the invention, it is possible to limit the formation of ammonium nitrate to $\leq 10$, in particular $\leq 5$, preferably $\leq 2.5$, % by weight, based on the dissolved metal. It is possible, without great difficulty, to achieve values of from 0.2 to 0.1% by weight of ammonium nitrate, based on dissolved metal.

0.2 to 2, in particular 0.25 to 1, preferably 0.27 to 0.8, mol of the additive is added per g-atom of metal to be dissolved. The additive is introduced continuously or in portions during dissolution of the metal. It can be added on commencement of dissolution of the metal, or in several portions of equal or different sizes during dissolution.

The ammonium nitrate formed during dissolution of the metal in nitric acid can also be eliminated subsequently, i.e. after completion of the dissolution, by introduction of the additive. The appropriate amount is added either partly during dissolution and partly after dissolution of the metal, or entirely after completion of dissolution. The subsequent use of the additive serves exclusively to remove ammonium nitrate; acceleration of dissolution of metal in nitric acid is not effected thereby. If it is desired to accelerate the dissolution, the additive must be introduced before or during dissolution of the metal.

The metal to be dissolved is usually covered either with the total amount of nitric acid at the beginning or the nitric acid is gradually added; it is also possible for the metal to be mixed with water. The additive can be added to the metal to be dissolved before or after addition of the nitric acid. It is also possible to pass it into the reaction at a uniform rate or in portions together with the nitric acid or separately from the nitric acid. The substance which forms nitrous acid can be a nitrite, for example an alkali metal nitrite or an alkaline earth metal nitrite, $NO_2$, $N_2O_4$, $(NO+O_2)$, $(NO+NO_2)$, or $N_2O_3$; in particular, $NO_2$, $N_2O_4$, $(NO+O_2)$, $(NO+NO_2)$, or $N_2O_3$; preferably $NO_2$ or $N_2O_4$. However, it is also possible to employ mixtures of the above-mentioned substances.

Suitable metals are iron, chromium, manganese, cobalt, or nickel; in particular, chromium, manganese, cobalt, or nickel; preferably manganese, cobalt, or nickel; and, most preferably, cobalt or nickel. It is also possible to employ mixtures of the above-mentioned metals. In general, however, it is simpler to dissolve the metals separately from one another and subsequently mix the finished metal nitrate solutions with one another in the desired ratio.

The metal is employed in highly-pure form, in particular, as obtained by electrolytic deposition. The reaction is carried out at 50° to 180° C., in particular, 60° to 150° C., preferably 80° to 125° C. Since nitrous acid tends to decompose and the substance which forms nitrous acid is possibly in gaseous form, the use of elevated pressure is sometimes advisable. Pressures of from 0.1 to 10, in particular, 0.2 to 2, preferably 0.3 to 1, MPa are adequate.

0.5 to 2.5, in particular 0.7 to 2, preferably 1.0 to 1.6, mol of nitric acid are employed per g-equivalent of metal to be dissolved.

The metal nitrate solutions prepared by the process according to the invention can be used for the preparation of support-free or support-containing catalysts. They are particularly suitable for the preparation of support-free or support-containing hydrogenation catalysts.

The examples below describe the invention in greater detail without constituting limitations thereon. They confirm that the formation of ammonium nitrate is effectively suppressed and, at the same time, the time necessary for dissolution of the metal in nitric acid is considerably reduced with the disadvantages of the known processes being avoided.

EXAMPLES 1 TO 7

30% by weight nitric acid is placed in 1 liter autoclave provided with a magnetic stirrer, and electrode nickel is added at room temperature. Liquid $N_2O_4$ as the substance which forms nitrous acid is metered into the autoclave via an inlet device connected to a compressed gas cylinder, and the autoclave is then sealed and heated to the target temperature at a rate of 5° C. per minute with stirring. When the target temperature has been reached, the reaction is allowed to continue. During the heating phase and during the reaction, pressure builds up in the autoclave. When the pre-specified reaction time has elapsed, the autoclave is allowed to cool, the pressure is reduced to atmospheric, and the aqueous nickel nitrate solution, which may contain still undissolved nickel metal, is removed.

The amounts of starting material, acid, the target temperature, and reaction time, the pressure, and the composition of the nickel nitrate solution contained (nickel nitrate and ammonium nitrate contents and level of undissolved nickel), are shown in Table 1 below.

COMPARISON EXAMPLES A TO D

The experimental procedure of Examples 1 to 7 is followed, except that addition of $N_2O_4$ as the substance which forms nitrous acid is omitted. The pressure resulting in Comparison Example B is attributable to the additional use of $O_2$.

The amounts of starting materials, the reaction conditions and the composition of the nickel nitrate solution obtained are collated in Table 1.

TABLE 1

| | Starting materials | | | Reaction conditions | | | Nickel nitrate solution | | |
|---|---|---|---|---|---|---|---|---|---|
| Example | $HNO_3$ (ml) | Ni (g) | $N_2O_4$ (g) | Temperature (°C.) | Time (hours) | Pressure (MPa) | Nickel (g/l) | $NH_4NO_3$ (g/l) | Undissolved nickel (g) |
| 1 | 675 | 109.6 | 34 | 90 | 7 | 0.6 | 137.3 | <0.17 | 15.5 |
| 2 | 691 | 100.0 | 37 | 100 | 5 | 0.5 | 167.0 | <0.17 | 17.4 |
| 3 | 691 | 99.9 | 16 | 100 | 3 | 0.74 | 154.0 | 4.13 | 21.5 |
| 4 | 730 | 105.5 | 35 | 100 | 4 | 0.62 | 169.7 | <0.17 | 12.6 |
| 5 | 708 | 102.6 | 27 | 120 | 3 | 0.78 | 173.4 | <0.17 | 10.3 |
| 6 | 677 | 97.9 | 31 | 90 | 6 | 0.1 | 157.6 | 1.27 | 14.3 |
| 7 | 726 | 105.0 | 32 | 90 | 6 | 0.02 | 154.0 | 2.24 | 16.8 |
| A | 710 | 103.2 | — | 100 | 18 | 0.3 | 141.8 | 33.0 | 28.6 |
| B | 688 | 100.8 | — | 100 | 17 | 1.0* | 146.4 | 26.9 | 16.9 |
| C | 727 | 105.4 | — | 130 | 16 | 0.3 | 154.8 | 28.2 | 19.4 |
| D | 782 | 113.2 | — | 150 | 14 | 0.5 | 189.3 | 22.0 | 9.5 |

*Due to additional injection of $O_2$

EXAMPLES 8 TO 14

58% by weight nitric acid and water are placed in a 2 liter autoclave provided with a magnetic stirrer, and electrode nickel is added at room temperature. The mixture is heated to 80° C., and highly concentrated nitric acid (99% by weight) is added. The highly concentrated nitric acid liberates $NO_2$ which forms nitrous acid in situ. In Examples 13 and 14, the use of 58% by weight nitric acid is omitted, and the 99% by weight nitric acid is added to the water/nickel mixture preheated to 80° C.

The autoclave is sealed and heated to the target temperature at 5° C. per minute with stirring. When the target temperature has been reached, the reaction is allowed to continue. During the heating phase and during the reaction, pressure builds up in the autoclave.

When the pre-specified reaction time has elapsed, the autoclave is allowed to cool, the pressure is reduced to atmospheric, and the aqueous nickel nitrate solution, which may contain still undissolved nickel metal, is removed.

The amounts of starting materials, the target temperature, the reaction time, the pressure and the composition of the nickel nitrate solution obtained (nickel nitrate and ammonium nitrate contents and the level of undissolved nickel), are shown in Table 2.

TABLE 2

| | Starting materials | | | | Reaction conditions | | | Nickel nitrate solution | | |
|---|---|---|---|---|---|---|---|---|---|---|
| Example | $HNO_3^{(1)}$ (ml) | $H_2O$ (ml) | Ni (g) | $HNO_3^{(2)}$ (g) | Temperature (°C.) | Time (hours) | Pressure (MPa) | Nickel (g/l) | $NH_4NO_3$ (g/l) | Undissolved nickel (g) |
| 8 | 255 | 240 | 100.0 | 69.4 | 100 | 6 | 0.6 | 139.1 | 21.0 | 11.3 |
| 9 | 257 | 242 | 100.9 | 69.4 | 100 | 6 | 1.5* | 190.2 | 16.9 | 9.8 |
| 10 | 113 | 245 | 102.2 | 141.8 | 100 | 6.5 | 1.0 | 184.3 | 8.6 | 8.3 |
| 11 | 337 | 264 | 110 | 42.2 | 100 | 6 | 1.5* | 170.8 | 15.5 | 11.5 |
| 12 | 307 | 241 | 100.3 | 64.0 | 100 | 4 | 1.0* | 173.0 | 0.17 | 9.8 |
| 13 | — | 249 | 101.4 | 282.0 | 100 | 6 | 1.0* | 179.2 | 6.2 | 7.6 |
| 14 | — | 248 | 103.4 | 348.3 | 120 | 6 | 1.0* | 186.3 | 4.1 | 9.3 |

(1) 58% strength by weight
(2) 99% strength by weight
*Due to additional injection of $O_2$

EXAMPLES 15 TO 17

30% by weight nitric acid is placed in a 1 liter autoclave provided with a magnetic stirrer, and pure cobalt is added at room temperature. Liquid $N_2O_4$ as the substance which forms nitrous acid is metered into the autoclave via an inlet apparatus connected to a compressed gas cylinder, and the autoclave is then sealed and heated to the target temperature at 5° C. per minute with stirring. When the target temperature has been reached, the reaction is allowed to continue. During the heating phase and during the reaction, pressure builds up in the autoclave.

When the pre-specified reaction time has elapsed, the autoclave is allowed to cool, the pressure is reduced to atmospheric, and the aqueous cobalt nitrate solution, which may contain still undissolved cobalt metal, is removed.

The amounts of starting material, the target temperature, the reaction time, the pressure and the composition of the cobalt nitrate solution obtained (cobalt nitrate and ammonium nitrate contents and the level of undissolved cobalt), are shown in Table 3.

COMPARISON EXAMPLES E AND F

The experimental procedure of Examples 15 to 17 is followed, except that addition of $N_2O_4$ as the substance which forms nitrous acid is omitted. The amounts of starting materials, the reaction conditions, and the composition of the cobalt nitrate solution obtained are also set forth in Table 3.

TABLE 3

| | Starting materials | | | Reaction conditions | | | Cobalt nitrate solution | | |
|---|---|---|---|---|---|---|---|---|---|
| Example | $HNO_3$ (ml) | Cobalt (g) | $N_2O_4$ (g) | Temperature (°C.) | Time (hours) | Pressure (MPa) | Cobalt (g/l) | $NH_4NO_3$ (g/l) | Undissolved cobalt (g) |
| 15 | 708 | 102.3 | 35 | 100 | 8 | 0.6 | 168.6 | <0.17 | 14.3 |
| 16 | 734 | 105.8 | 33 | 100 | 6 | 0.5 | 172.2 | <0.17 | 11.5 |
| 17 | 676 | 109.8 | 33.5 | 120 | 5 | 0.9 | 183.0 | <0.17 | 9.8 |
| E | 690 | 100.2 | — | 100 | 19 | 0.3 | 143.3 | 33.0 | 22.3 |
| F | 710 | 103.5 | — | 120 | 16.5 | 0.4 | 146.4 | 32.0 | 19.6 |

EXAMPLE 18

400 ml of an aqueous cobalt nitrate solution (cobalt content 36.6 g=91.5 g of cobalt/liter; $NH_4NO_3$ 7.44 g=18.6 g of $NH_4NO_3$/liter) prepared by dissolving cobalt in nitric acid is placed at room temperature in a 1 liter autoclave provided with a magnetic stirrer.

23 g of liquid $N_2O_4$ as substance which forms nitrous acid are metered into the autoclave via an inlet apparatus connected to a compressed gas cylinder, and the autoclave is then sealed and heated to 90° C. at 5° C. per minute with stirring. The reaction is then allowed to continue at 90° C. for 7 hours. The pressure is about 0.1 to 0.2 MPa. The ammonium nitrate content is reduced from 18.6 to 1.1 g of $NH_4NO_3$/liter due to this treatment.

What we claim is:

1. A process for the preparation of a nitrate of a metal of atomic number 24 to 28 in aqueous solution comprising dissolution of said metal in nitric acid, and addition of 0.2 to 2 mols per gram atom of said metal of an additive selected from the group consisting of nitrous acid, a substance which forms nitrous acid, and mixtures thereof, whereby ammonium nitrate concentration is reduced.

2. The process of claim 1 wherein said dissolution is carried out at elevated temperature.

3. The process of claim 2 wherein said temperature is 50° to 180° C.

4. The process of claim 3 wherein said temperature is 60° to 150° C.

5. The process of claim 4 wherein said temperature is 80° to 125° C.

6. The process of claim 1 wherein said acid concentration is 0.25 to 1.

7. The process of claim 6 wherein said acid concentration is 0.27 to 0.8.

8. The process of claim 1 wherein said metal is selected from the group consisting of chromium, manganese, cobalt, nickel, and mixtures thereof.

9. The process of claim 8 wherein said metal is selected from the group consisting of manganese, cobalt, nickel, and mixtures thereof.

10. The process of claim 9 wherein said metal is selected from the group consisting of cobalt, nickel, and mixtures thereof.

11. The process of claim 1 wherein said substance is selected from the group consisting of alkali metal nitrites, alkaline earth metal nitrites, $NO_2$, $N_2O_4$, NO and $O_2$, NO and $NO_2$, $N_2O_3$, and mixtures thereof.

12. The process of claim 11 wherein said substance is selected from the group consisting of $NO_2$, $N_2O_4$, NO and $O_2$, NO and $NO_2$, and $N_2O_3$, and mixtures thereof.

13. The process of claim 12 wherein said substance is selected from the group consisting of $NO_2$, $N_2O_4$, and mixtures thereof.

14. The process of claim 1 wherein said dissolution is carried out at elevated pressure.

15. The process of claim 14 wherein said pressure is 0.1 to 10 MPa.

16. The process of claim 15 wherein said pressure is 0.2 to 2 MPa.

17. The process of claim 16 wherein said pressure is 0.3 to 1.0 MPa.

18. The process of claim 1 wherein said nitric acid is present in an amount of 0.5 to 2.5 mols per gram atom of said metal.

19. The process of claim 18 wherein said amount is 0.7 to 2.

20. The process of claim 19 wherein said amount is 1.0 to 1.6.

21. The process of claim 1 wherein said additive is added continuously or portionwise.

22. The process of claim 1 wherein said additive is added when said dissolution begins.

23. The process of claim 1 wherein said additive is added after said dissolution has begun.

24. The process of claim 23 wherein said additive is added after said dissolution is completed.

* * * * *